G. P. BOSWORTH.
SPRING NEEDLE KNITTING MACHINE.
APPLICATION FILED OCT. 30, 1919.

1,416,257.

Patented May 16, 1922.
6 SHEETS—SHEET 3.

Inventor:
George P. Bosworth,
by Emery, Booth, Janney and Varney;
Attys.

G. P. BOSWORTH.
SPRING NEEDLE KNITTING MACHINE.
APPLICATION FILED OCT. 30, 1919.

1,416,257.

Patented May 16, 1922.

Inventor:
George P. Bosworth.
by Emery, Booth, Janney and Varney,
Attys.

UNITED STATES PATENT OFFICE.

GEORGE P. BOSWORTH, OF CENTRAL FALLS, RHODE ISLAND, ASSIGNOR TO HEMPHILL COMPANY, OF CENTRAL FALLS, RHODE ISLAND, A CORPORATION OF MASSACHUSETTS.

SPRING-NEEDLE KNITTING MACHINE.

1,416,257.      Specification of Letters Patent.    Patented May 16, 1922.

Application filed October 30, 1919. Serial No. 334,477.

*To all whom it may concern:*

Be it known that I, GEORGE P. BOSWORTH, a citizen of the United States, and a resident of Central Falls, in the county of Providence and State of Rhode Island, have invented an Improvement in Spring-Needle Knitting Machines, of which the following description, in connection with the accompanying drawings, is a specification, like characters on the drawings representing like parts.

This invention relates to knitting machines and more particularly to spring needle knitting machines and is an improvement over the invention disclosed in my Patents No. 1,209,256 dated December 19, 1916 and No. 1,235,545 dated August 7, 1917.

In the drawings I have shown merely for illustrative purposes one example of a machine embodying my invention wherein:

Fig. 3 is a detail plan view of the ring upon which the web holder advancing cams are supported together with the carrier ring for the web holder out-throw cam and for the needle beard presser cams, positions of the needle beard presser and needles being shown therein;

The invention may be illustrated in connection with any suitable type of knitting machine but herein I have shown it embodied in a circular knitting machine involving certain characteristics of the so-called Banner machine disclosed in the Hemphill Patent No. 933,443, patented September 7, 1909, and still other features of my patents to which reference has previously been made. In these types of machines the needle carrier is cylindrical and contains a circular series of independently movable needles, the cam ring being stationary while the needle cylinder or carrier is arranged to reciprocate and rotate. Obviously however the needle cylinder may be arranged as non-movable while the cam ring may have imparted thereto a rotary or reciprocatory motion. The invention, in its broader aspects, is applicable to straight bar knitting machines as well as to the rotary type, and is capable of producing various articles of manufacture although in the present example the machine is adapted for producing hosiery, and while in the following description the particular example shown will be described and referred to in detail it is to be understood that my invention is in nowise limited to such application thereof.

In the drawings 1 represents the frame of a knitting machine upon which is mounted a needle cylinder 2, said needle cylinder having provision for rotary or reciprocatory motion in a manner characteristic of the machines aforesaid.

Secured adjacent to the upper end of said needle cylinder is a web holder bed 3 rotatable with said needle cylinder.

Arranged in grooves in the outer face of said needle cylinder 2 for independent movement therein, are suitable knitting needles herein spring beard needles 4 adapted to be reciprocated in said grooves by suitable knitting cams 5 mounted upon a cam plate 6 of a construction characteristic of the said Banner knitting machine. Rotary and reciprocatory movements are imparted to said needle cylinder in the usual well known manner and further description thereof is not believed herein necessary more fully to describe.

Yarn feeding means are provided to introduce yarn to the stems of the needles at the proper time and these yarn feeding means are so disposed as to effect the feeding of the yarn to the needles during the movements of the needle cylinder in opposite directions when knitting reciprocatingly, or during rotary knitting as will be hereinafter described.

Figure 8:
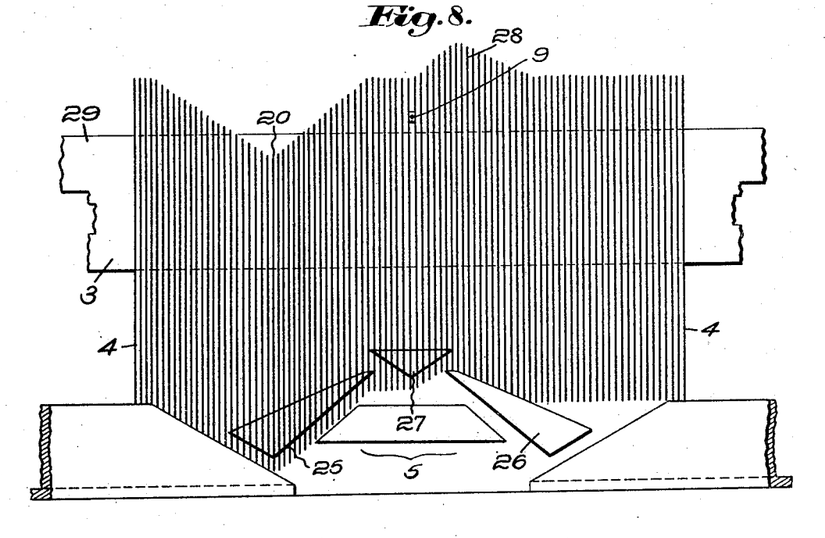
Fig. 8 is a development showing the knitting cams, needles and yarn guides, the needles being arranged to illustrate clearly the knitting wave.
Figure 9:
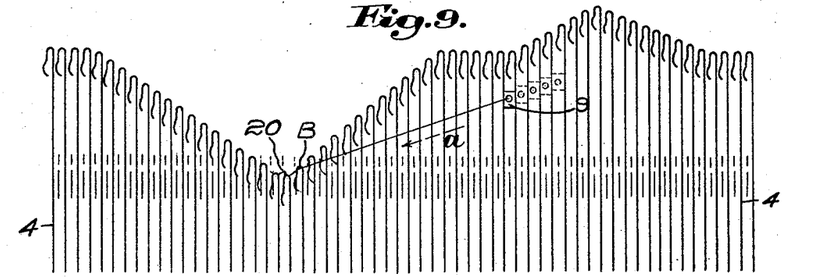
Fig. 9 is an enlarged view similar to Fig. 8 of the upper ends of the needles illustrating the knitting wave of the needles and the position of the yarn during the loop forming operations, one yarn guide being shown in full lines in said figure and others in dotted lines.

For effecting the feeding of the yarn I herein provide a plurality of yarn guides preferably five as represented at 9, 10, 11, 12 and 13. These yarn guides are shown as embodying in their construction pivoted levers mounted upon a suitable pivot 14 arranged in a support 15 of any desired construction. The forward ends of said yarn levers are preferably tubular in form to receive and guide the yarn from suitable yarn masses, not shown, to the outer portions of the shanks of the knitting needle. In the present example the first yarn guide 9 of the series is arranged substantially central and radial with respect to the needle cylinder, the other yarn guides of said series being placed at one side of said guide 9 and preferably upon the opposite side thereof from that in which the yarns from said guides are led to the needles during rotary knitting, said direction being indicated by the arrow $a$ in Fig. 9. The several guides are pivotally mounted for the purpose of permitting operation thereof from yarn guiding positions to elevated or non-guiding positions and any suitable means may be provided for effecting the proper movements of said yarn guides such for example as the instrumentalities disclosed in said Hemphill patents and in my copending application (Serial No. 306,094) to which reference may be had for further information if desired. The yarns from the several yarn guides are led from the outer extreme ends thereof, as most clearly shown in Figs. 8, 9 and 10, in a substantially direct line to the loop forming point in the knitting wave of the series of needles and the yarn so led is not sunk between said needles but rests against the outer portions of the shanks of those needles which intervene between the tangential point of the yarn leading from said guides and the loop forming point of knitting herein shown at B (see Fig. 9), the tension of the yarn and the relation of the ends of said yarn guides to the needles being such as to allow said yarns to lie against said needles until it is caught by the beards thereof without requiring any sinking and without necessitating the use of intermediate yarn supporting devices of any kind.

Figure 6:
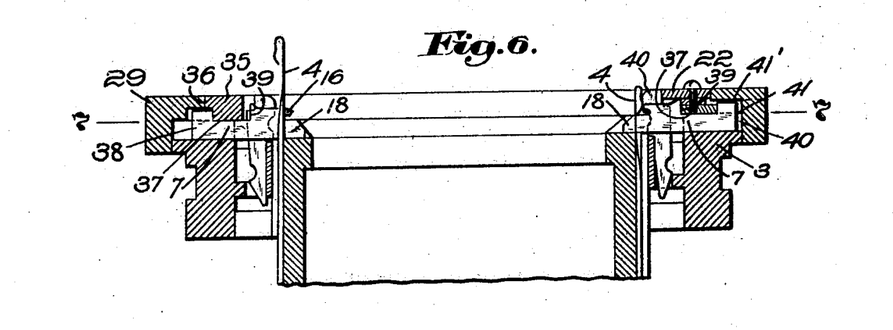
Fig. 6 is a transverse section taken on the line 6—6 of Fig. 3.
Figure 7:
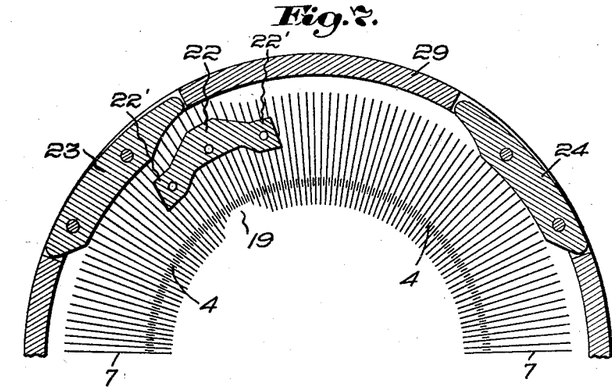
Fig. 7 is a detail section taken substantially on the line 7—7 of Fig. 6 illustrating the two web holder advancing cams and the web holder out-throw cam in connection with a series of web holders, the latter cam being positioned in operative relation to one of said advancing cams whereby a knitting wave is produced in the series of web holders.
Figure 11:
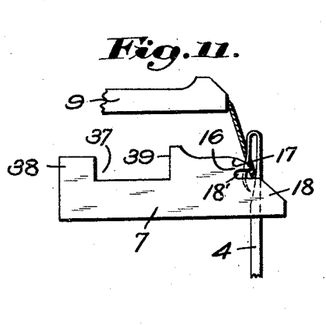
Fig. 11 is an enlarged section on the line 11—11 of Fig. 9 illustrating the position of the yarn with respect to the web holder and needle of that plane.
Figure 12:
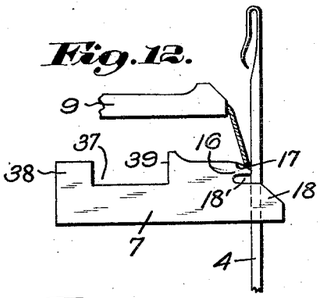
Fig. 12 is a view similar to Fig. 11 taken on the line 12—12 of Fig. 10 and illustrates the position of the surplus yarn while being supported by the web holders during reciprocating knitting.

Cooperating with said needles in the formation of the knitting fabric are a plurality of web holders 7 most clearly shown in Figs. 11 and 12, and which embody in their construction an upper nib 16 having a rounded surface 17 adjacent the forward end thereof and a lower nib 18 constituting a work supporting member, said upper and lower nibs being separated by a slot 18' constituting the throat of said holder. The web holders 7 are given the usual radial movement in suitable grooves provided in the bed 3 during the loop forming operations of the needles by suitable web holder advancing cams and web holder out-throw cams whereby a wave 19 most clearly shown in Fig. 7 will be described by the inner ends of the nibs of said web holders at the proper time to cooperate with the needles 4 when functioned by the knitting cams 5. In the present example the wave 19 is very short so that said upper nibs 16 will be withdrawn from between their respective needles for a space sufficient only to allow the needle loops to be drawn down past the lower nibs 18 of said web holders thereby to effect the shedding of said loops from the needles in the well known manner and to allow the yarn, which at this time is being measured by the needles in their downward movements over said web supporting nibs 18, to have a free and uninterrupted passage from the yarn feeding means to said lower nibs. The extent of movement of each web holder is from a point wherein the inner end of the upper nib 16 projects sufficiently beyond the back portion of the shanks of adjacent needles to insure the engagement of the throat 18' of said web holder with the fabric, to a point wherein said upper nib aligns with the plane of the outer faces of the shanks of the needles at the large diameter of said needles, said latter position being illustrated in Figs. 11 and 12 while the former position is shown at the left of Fig. 6. The object of moving said web holders to their outermost positions, as just described, is to insure a clear and uninterrupted passage of the yarns from the several yarn guides to the point 20 where the loops are cast from the needles (see Figs. 8 and 9).

By moving the inner extremities of the upper nibs 16 to a line coinciding with the plane of the outer faces of the larger portions of the stems of said needles a free passage of the yarn between said nibs and the needle stems will be permitted during the feeding of the yarn to said needles by reason of the fact that the needles at the point or points where said yarn crosses the paths of said nibs are cut away at the eye portions thereof which lie immediately at the rear of, and extend slightly below the beards of said needles and this difference in diameter between the two portions of said needles provides, as stated, ample space or clearance for said yarn thus leaving said yarn unsupported except as to its contact with the outer faces of the needles. The inner extent of movement of said web holders is sufficient to cause the throat 18' of the web holder to engage the sinker wales of the fabric and prevent the upward movement of said fabric during the raising of the needles, this being the usual or normal function of the web holders.

The reciprocation of the web holders is herein effected by an out-throw cam 22 cooperating with advancing cams 23 and 24, two being provided for the purpose of functioning said web holders during reciprocating knitting, said advancing cams being disposed upon opposite sides of the centrally positioned yarn guide 9 and at the proper distances therefrom to correspond with the positions of the needle cams hereinafter described. The needles are functioned to produce the knitting wave, shown most clearly in Fig. 8, by suitable stitch cams herein two which are represented at 25 and 26 and disposed at suitable distances from opposite sides of said yarn guide 9 to produce knitting waves during reciprocating knitting. In the present example as illustrated in conjunction with the stitch cams 25 and 26 a fixed center cam 27 is used, said cam being similar to that shown in said Hemphill Patent 933,443 wherein latch needles are employed; in other words in the present machine the knitting cams usually employed in latch needle machines are used instead of the type commonly used in spring needle machines wherein a center switch cam or cams are provided as shown in my Patent No. 1,235,545 previously referred to. The use of the latch needle machine type of knitting cam is made possible in the present example by the arrangement of web operating cams which advance the upper nibs of said web holders in time to engage the web and prevent upward movement thereof when the needles are being elevated prior to the engagement with said center cam 27. Ordinarily this extra movement, as shown at 28, Fig. 8, has to be dispensed with for the reason that the web holders are not returned, following the loop shedding operations of the needles, in time to prevent such upward movement. The use of said stitch cams as described effects a material saving in the operation of the machine by reducing the number of parts and for the reason that a different and much simpler construction of web holder cam supporting ring is permitted, for example the advancing cams 23 and 24 are, in the present example, mounted upon a supporting ring 29 substantially similar to the usual cap ring employed in said Banner machine. The cams 23 and 24 are arranged at such distances apart, and upon opposite sides of the yarn guide 9, as to eliminate the usual oscillatory or shogging movement thereof during to and fro or reciprocating knitting. The supporting ring 29 therefor is however provided with the usual bumper bracket 30 having radial arms 31 and 32 (see Fig. 3) supporting adjustable screws 33 adapted for engagement with the usual bracket 34 surmounting the bed of the machine, which bracket carries the yarn guide support as is characteristic of said Banner knitting machine.

Although adjustment is provided between arms 31 and 32 and said bracket 34, in the present example very little, if any, relative movement is allowed, only sufficient movement being herein provided to prevent cramping of the ring upon the web holder bed during the reciprocating movements of the machine. The out-throw cam 22 for said web holders is mounted independently of said advancing cams 23 and 24, upon a carrier ring 35 arranged within and substantially concentric with said supporting ring 29, said carrier ring 35 being centrally positioned in said supporting ring 29 for reciprocatory engagement therewith at 36. The ring 35 is formed to fit into the depression 37 formed in the upper edges of the web holders 7 by and between the operating butt 38 thereof and the shoulder 39 at the rear end of the upper nib 16, said ring being supported, not by the web holders but by the upper surface 41 of said bed 3. The supporting ring 29 on the other hand has an annular recess 40 which receives the upper web supporting portion of said web bed 3 and said latter ring is also supported by the upper surface 41 of said bed. The butts 38 terminate slightly below the top of an annular groove 41' formed to receive them in the underside of said ring 29. The upper surfaces of the supporting ring 29 and of the carrier ring 35 are substantially in alignment or flush with each other and relative reciprocatory movement therebetween is limited herein by stops consisting of brackets 42 secured to the supporting ring 29 and bearing adjusting screws 43 which, at certain times in the operation of the machine, are adapted to be engaged by an abutment 44 upon the carrier ring 35. By providing the two brackets 42 and the adjusting screws which cooperate with said abutment 44 a predetermined shogging or oscillatory movement may be provided between the carrier ring 35 and said supporting ring 29 sufficient to allow the out-throw cam to automatically adjust itself during to and fro knitting so as properly to cooperate with the advancing cams 23 and 24 respectively in the formation of short knitting waves by said web holders.

The cam 22 is secured to the under side of the carrier ring 35 within a suitable recess formed in said ring and the cam is of such a depth measured lengthwise of the web holders that the outer and inner edges thereof are adapted substantially to engage the butt 38 and shoulder 39 respectively of said web holders thereby preventing overthrow of said web holders during reciprocating movements thereof should the machine be operated at a very high rate of speed, the extent of movement of said web holders being the same regardless of the speed at which the machine is running. The cam 22 is provided at opposite sides, with wings 22' which form continuations of the web holder engaging portion of the ring 35 and are for the purpose of receiving the thrust from the advancing web holders, said cam being composed preferably of hardened steel the better to withstand the wear to which it is subjected. The function of the carrier ring 35 is in the present example at least twofold: the first function being as hereinbefore described to carry the out-throw cam for the web holders, while a second function thereof is to support a presser cam 45, said presser cam being herein shown directly above said out-throw cam and having its operative surface 46 at the inner side of said ring. The presser cam 45 has two presser deflecting surfaces 47 and 48 disposed at suitable distances apart to effect pressing of the proper needle beards during reciprocating knitting. The pressing surfaces 47 and 48 do not, in the present example, engage directly with the beards of the needles but instead operate upon individual pressers 40 herein shown substantially similar to those disclosed in the Patents Nos. 1,209,256 and 1,235,545, the construction and operation of said pressers being the same as shown in said patents, no further description herein is believed necessary other than to say the presser surfaces 47 and 48 engage the rear edges of said pressers and advance them to engage and press the beards of said needles. Obviously the friction produced by the engagement of said cams with said pressers tends to produce a lateral deflection or radial thrust of the carrier ring 35 and thus cause the ring at the side opposite to that at which said cam is located to wear more rapidly than the cam side of said ring and to overcome such uneven wearing I have provided herein a second presser cam 50 substantially similar in construction to the cam 45 and herein diametrically opposite to said cam 45 so as to engage and rock the pressers inwardly thereby tending substantially to equalize the thrust and incidentally the wear upon said ring.

The cam 50 also constitutes a localized frictional device for insuring a relative movement between the carrier ring 35 and the supporting ring 29, or in other words the two opposed presser cams, by reason of the pressure exerted upon them by the pressers, insure movement of said carrier ring with the needles and pressers upon the starting of the machine and until the abutment 44 has engaged one or the other of the stop screws 43. Thus the automatic shogging movement of said carrier ring will be more positive than in the ordinary case where the mere engagement of a single presser cam with the presser or the engagement of the usual web holder cams with the web holders are relied upon to effect the automatic adjustment of said cams during the reversal from one direction of cylinder travel to another.

Obviously the invention is not limited to two presser cams diametrically opposed but may be varied in number and in position according to the function and the type of machine employed. Furthermore said second presser cam may be employed in a similar capacity as the first such as that embodied in my Patent No. 1,154,169 where two sets of cams are employed for knitting split foot hosiery. As previously stated the yarn guide 9 is arranged substantially central of the machine and this guide is the one usually employed to supply the principal yarn to the needles either during rotary knitting or reciprocating knitting and by being arranged centrally as shown the reversal in the direction of cylinder travel will not vary the angle of the yarn as led from said yarn guide to the knitting point.

Figures 1, 2:
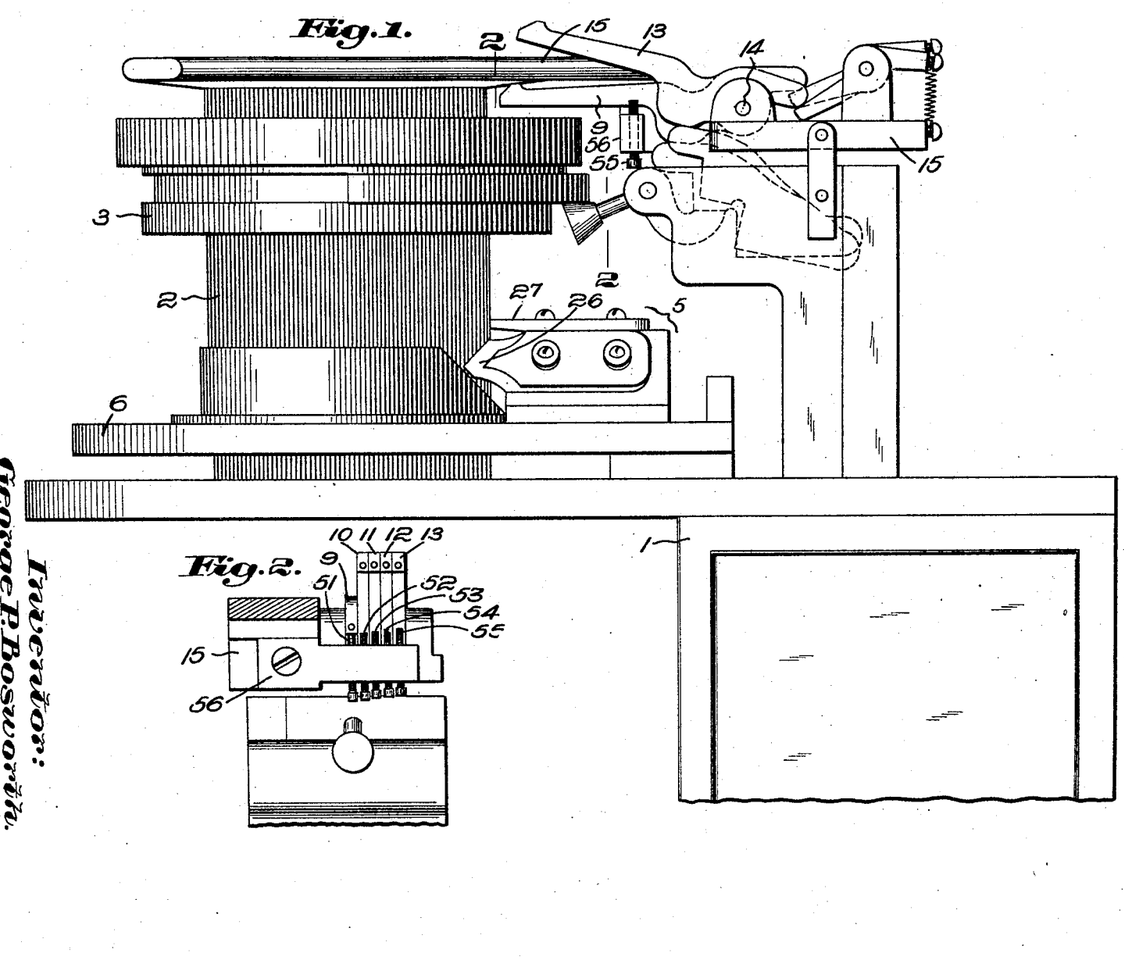
Fig. 1 is a side elevation of the upper part of the knitting machine.
Fig. 2 is a detail front elevation of the yarn guides and their supports as viewed from the line 2—2 of Fig. 1.
Figure 4:
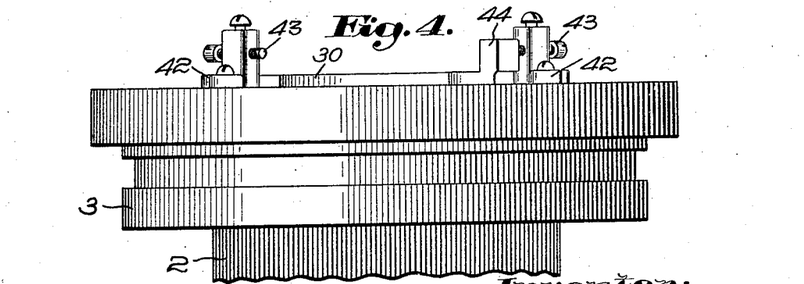
Fig. 4 is a detail side elevation of the parts shown in Fig. 2 together with the web holder bed ring and portions of the needle cylinder to which said bed ring is attached.
Figure 5:
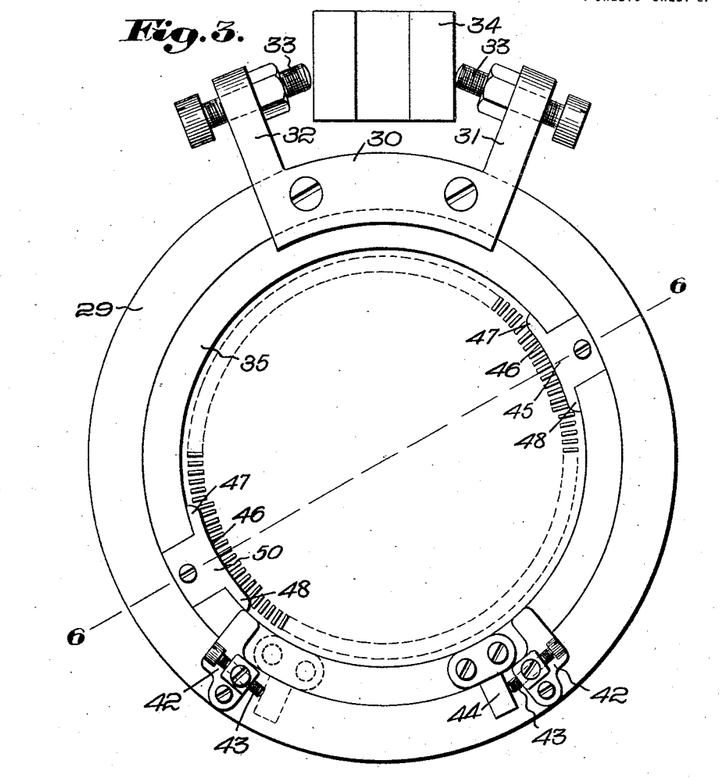
Fig. 5 is an underneath plan view of the rings shown in Fig. 2.

The other yarn guides viz 10, 11, 12 and 13 are not used for supplying regular yarn to the needles but supply reinforcing yarn or yarns of various character used in different parts of the stocking and particularly during rotary knitting. Therefore the yarn in being led from said last named guides will, in substantially all cases, lead in the one direction indicated by the arrow $a$ in Fig. 9. In a spring needle machine of the type herein shown the yarns are usually led directly from the end of the yarn levers to the knitting point dispensing with a fixed yarn guide or throat usually necessary in latch needle machines. When such is the case the difference in the distances of the several guides from the knitting point, these being in fixed relation to the machine, naturally produce variations in the angle of the several yarns when said guides are permitted to drop to the same level, therefore in the present example means are provided for individually adjusting the delivery ends of said yarn, as most clearly shown in Figs. 2 and 10, so as to cause the yarns from said several guides when in their yarn feeding positions to follow substantially the same path or in other words to describe the same angle with respect to a horizontal plane, thereby securing a substantially equal degree of resistance upon all of the yarns. The means herein provided for individually adjusting said yarn guides consists of adjusting screws 51, 52, 53, 54 and 55 for engaging respectively the yarn guides 9, 10, 11, 12 and 13, said screws being mounted beneath said yarn guides in a bracket 56 secured herein to the yarn guide support 15.

Figure 10:
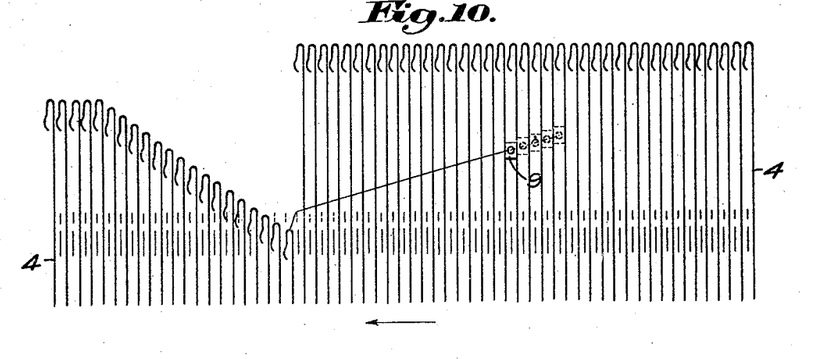
Fig. 10 is a diagram similar to Fig. 9 wherein the instep needles are shown elevated and the surplus yarn which rests against the shanks of the elevated needles is shown supported by the upper web holder nibs.

Although the yarns leading from the said guides to the needles are unsupported by the upper nibs of said web holders in rotary knitting, there are times when it is desirable that the yarn engage said upper nibs, as for example when certain of the needles are elevated for reciprocating knitting, see Fig. 10, and the purpose of this is to prevent the yarn from being caught between the web holders and the stems of the idle needles, for if this should happen the surplus yarn which rests at times against said idle needles, would be sunk between the stems thereof and occasionally result in the breaking of said yarn. To prevent such action the upper nibs of said web holders, as previously explained, are preferably not moved outwardly beyond the outer plane of the stems of said needles so that with the needles elevated and the direction of travel of the needle cylinder reversed, the surplus yarn will be held or pressed back by the large portions of the end needles of the idle series upon the top of the upper nib 16 of the web holder cooperating with said end needles as shown in Fig. 10 and the yarn will thereby be protected.

Figure 13:
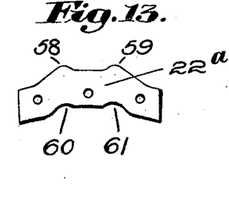
Fig. 13 is a detail plan illustrating a modified form of out-throw cam.
Figure 14:
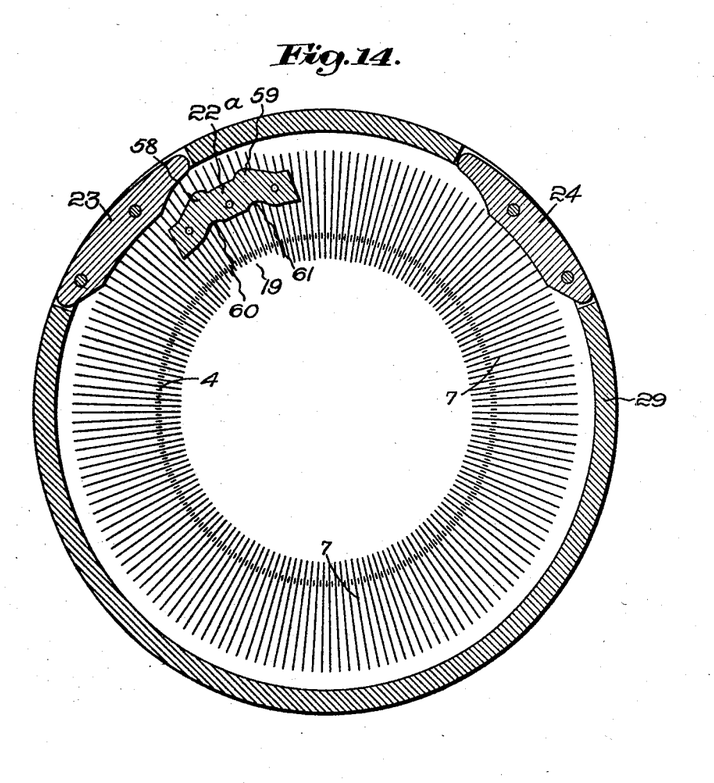
Fig. 14 is a view generally similar to Fig. 7, but representing that form of out-throw cam shown in Fig. 13.

In Figs. 13 and 14 I have illustrated at 22ª a web holder out-throw cam varying slightly in construction from the cam 22 hereinbefore described in that a momentary additional outward throw is increased at 58 and 59 in order to effect the movement of the upper nibs 16 outward far enough beyond the outer plane of the needle stems to provide ample space for the yarn to pass downwardly along the needles without interference, even though the large portions of said needles are aligning with the web holders at the time when this cam functions. The extent of each of the cams 58 and 59 is obviously very short so that the web holders which are thrown out thereby substantially at the instant the pressers are acting to press the beards of the needles, may be thereafter immediately retracted by the surfaces 60 and 61, to their normal outer positions hereinbefore described.

While I have herein shown and described merely for illustrative purposes a specific embodiment of my invention, and have disclosed and discussed in detail the construction and arrangement incidental to such disclosure it is distinctly to be understood that the invention is limited neither to the mere details or relative arrangement of parts nor to the specific application herein shown but extensive variations from the illustrations may be made without departing from the principles thereof.

Claims—

1. In combination, a series of spring beard needles, pressers and presser cam means therefor knitting cams for said needles, web holders, yarn feeding means, web holder advancing cams on opposite sides of said yarn feeding means for reciprocating knitting, an outthrow web holder cam movable circumferentially with respect to said advancing web holder cams so as to cooperate respectively with said advancing cams to withdraw said web holders, said presser cam means being relatively movable circumferentially with respect to at least one of said web holder cams.

2. In combination, a circular series of spring beard needles, knitting cams for severally functioning said needles in reciprocating knitting, web holders, web holder advancing cams to cooperate respectively with said knitting cams in reciprocating knitting, a shogging out-throw cam for cooperating alternately with said web holder advancing cams in withdrawing said web holders from engagement with the web in the immediate vicinity of each stitch forming point whereby the work will be held at all other points during the upward movement of the needles, and presser cam means shogging with respect to said web holder advancing cams to cooperate with the needles substantially at the then functioning web holder advancing cam.

3. In combination, a series of spring beard needles, pressers, and presser cam means therefor relatively shiftable with respect to the needles, knitting cams respectively to function said needles in reciprocating knitting, web holders, web holder advancing cams to cooperate respectively with said knitting cams, an independently mounted shogging outthrow cam cooperating alternately with said advancing cams during reciprocating knitting, said presser cam means being relatively shiftable with respect to said web holder advancing cams, and means to vary the shogging movements of said outthrow cam relatively to said advancing cams.

4. In combination, spring beard needles, knitting cams to function said needles in reciprocating knitting, web holders, relatively stationary web holder advancing cams to cooperate respectively with said knitting cams, individual needle beard pressers, and conjointly movable web holder out-throw cam and needle beard presser cam for respectively withdrawing said web holder and pressing said needle beards during reciprocating knitting.

5. In combination, a series of needles, yarn feeding means, stitch cams disposed upon opposite sides of said yarn feeding means to function said needles in reciprocating knitting, web holders a web holder support, web holder advancing cams cooperating respectively with said stitch cams, a common web holder out-throw cam having a shogging movement between said web holder advancing cams, and other frictional means cooperating in effecting movement of said outthrow cam relatively to said advancing cams.

6. In combination, a series of spring beard needles, yarn feeding means, stitch cams disposed on opposite sides of said yarn feeding means to function said needles during reciprocating knitting, web holders, web holder advancing cams to cooperate respectively with said stitch cams, a web holder outthrow cam disposed for movement between said web holder advancing cams, individual needle beard pressers, and a presser cam conjointly movable with said web holder outthrow cam and independently of said advancing cams to cooperate respectively with said stitch cams in reciprocating knitting.

7. In combination, a circular series of spring beard needles, yarn feeding means therefor, stitch cams disposed upon opposite sides of said yarn feeding means to function said needles during reciprocating knitting, web holders, web holder advancing cams to cooperate respectively with said stitch cams, a web holder out-throw cam having relative shogging movement with respect to said web holder advancing cams so as alternately to cooperate with said web holder advancing cams during reciprocating knitting, individual needle beard pressers, a presser cam mounted for movement in unison with said out-throw cam, and frictional means to effect to and fro movements of said out-throw cam and said presser cam during reciprocating knitting.

8. In combination, a series of spring beard needles, yarn feeding means, stitch cams disposed upon opposite sides of said yarn feeding means to function said needles in reciprocating knitting, web holders, web holder advancing cams to cooperate respectively with said stitch cams in advancing said web holders to the needles in reciprocating knitting, and a web holder out-throw cam adapted to automatically shift for alternate cooperation with said web holder advancing cams in the formation of independent waves by said web holders at each knitting point during reciprocating knitting, and presser means for said needles movable with said web holder outthrow cam.

9. In combination, a needle cylinder, a series of spring beard needles carried thereby, web holders disposed for independent movement upon said cylinder, yarn feeding means, stitch cams disposed on opposite sides of said yarn feeding means for reciprocating knitting, web holder advancing cams to cooperate respectively with said stitch cams, a supporting ring therefor, a web holder out-throw cam, a carrier ring for said outthrow cam mounted to oscillate relatively to said advancing cam ring, individual pressers for said needles, and a presser cam mounted upon said carrier ring and movable therewith to cooperate alternately with said stitch cams.

10. In a knitting machine, the combination of a series of spring beard needles, knitting cams, said needles being capable of rotary and reciprocatory movements relatively to said cams, web holders, web holder advancing cams mounted for shogging movement, a web holder out-throw cam mounted for independent and relatively greater shogging movement than that of said advancing cams, independent needle beard pressers and a presser cam movable with said outthrow cam for operating said pressers substantially coincidently with the outthrow of said web holders.

11. In a knitting machine, the combination of a series of spring beard needles, knitting cams, said needles being capable of rotary and reciprocatory movements relatively to said cams, web holders, web holder advancing cams adjustable for shogging movement, a web holder outthrow cam adapted for relatively greater shogging movement than that of said advancing cams, independent needle beard pressers, a presser cam movable with said out-throw cam and means to counteract the thrust upon said presser cam by said pressers.

12. In a knitting machine, the combination of a circular series of spring needles, knitting cams, web holders, web holder advancing cams having circumferential adjustment, a web holder out-throw cam mounted for oscillatory movement independently of said web holder advancing cams, independent needle beard pressers, and opposed presser cams mounted for movement with said outthrow cam for actuating said needle beard pressers.

13. In combination spring needles, a needle cylinder therefor, a web holder bed secured to said cylinder, web holders mounted therein, web holder advancing cams, a supporting ring for said advancing cams mounted upon said bed and substantially stationary relatively thereto, a web holder out-throw cam, a carrier ring therefor mounted for oscillatory movement relatively to said supporting ring, adjustable means for regulating said oscillatory movements and other frictional means for cooperating in effecting relative movement between said carrier ring and said supporting ring.

14. In combination, spring needles, a needle carrier, a web holder bed secured to said carrier, web holders mounted therein, web holder advancing cams, a supporting member for said advancing cams mounted upon said bed and substantially stationary relatively thereto, a web holder out-throw cam, a carrier therefor mounted for movement relatively to said supporting member, individual needle beard pressers, a presser cam supported by said cam carrier, and frictional means including a second presser cam for effecting relative movement between said cam carrier and said supporting member.

15. In a knitting machine, a series of spring needles, pressers and knitting cams therefor, web holders, a pair of web holder advancing cams, and a single out-throw cam and presser cam means arranged for predetermined, variable, oscillatory movement between said advancing cams during reciprocating knitting to confine the wave in the series of said web holders to the knitting point of the machine.

16. In combination, a series of spring beard needles, presser means therefor knitting cams to function said needles in reciprocating knitting, web holders, relatively stationary web holder advancing cams to cooperate respectively with said knitting cams, a shogging out-throw cam for cooperating alternately with said advancing cams during reciprocating knitting, a carrier therefor and means to vary the shogging movements of said out-throw cam and its carrier and the position of said presser means relatively to said advancing cams.

17. In combination, a series of spring beard needles, knitting cams respectively to function said needles in reciprocating knitting, web holders, relatively stationary web holder advancing cams to cooperate with said knitting cams, a shogging out-throw cam for cooperating alternately with said advancing cams during reciprocating knitting, independent needle beard pressers, and a presser cam mounted to move with said out-throw cam.

18. In combination, a series of spring beard needles, stitch cams to function said needles during reciprocating knitting, web holders cooperating with said needles a web holder support, web holder advancing cams cooperating respectively with said stitch cams, a common web holder out-throw cam having a carrier for said outthrow cam, shogging movement between said web holder advancing cams and said stitch cams, and means movable with said carrier for cooperating in effecting movement of said outthrow cam relatively to said advancing cams.

19. In a knitting machine having spring beard needles, individual pressers for said needles, a presser cam for operating said pressers to press the beards of said needles, and localized means to counteract the radial thrust upon said presser cam by said pressers.

20. In a knitting machine having spring beard needles, individual pressers for said needles, a presser cam for operating said pressers to press the beards of said needles, and means to counteract the thrust upon said presser cam by said pressers including a second presser cam substantially diametrically opposed to the aforesaid presser cam.

21. In a knitting machine, the combination with a series of needles and web holders, of a pair of web holder advancing cams, and a single web holder outthrow cam to cooperate with said advancing cams in reciprocating knitting, said outthrow cam having a rest at the normal outer positions of said web holders, and means at opposite ends of rest to impart momentary additional movements to said web holders.

22. In a knitting machine, a series of knitting needles, web holders to cooperate with said needles having upper and lower nibs, cams for advancing said web holders, a common outthrow cam having a rest to maintain said web holders with their upper nibs substantially aligning with the plane of the outer faces of the needle shanks, and means on said cam to impart momentary additional outward movements to said web holders to provide a space between the ends of said upper nibs and said plane of the outer faces of said needles.

23. In combination, a series of spring beard needles, pressers and presser cam means knitting cams for said needles, web holders, yarn feeding means, web holder advancing cams on opposite sides of said yarn feeding means for reciprocating knitting, an out-throw cam between said web holder advancing cams, and means to hold one of said cams substantially stationary at all times, at least one of the remainder of said cams and said presser cam means being arranged automatically to move and thereby to cooperate in effecting movement of said web holders.

24. In a knitting machine, a series of needles, knitting cams therefor, a web holder support, web holders, a pair of web holder advanced cams, a single out-throw cam arranged for predetermined, variable, oscillatory movement between said advancing cams during reciprocating knitting to confine the wave in the series of said web holders to the knitting points of the machine, and other frictional means cooperating in effecting relative movement between said out-throw cam and said advancing cams.

25. In combination, a series of spring beard needles, knitting cams to function said needles in reciprocating knitting, web holders, relatively stationary web holder advancing cams to cooperate respectively with said knitting cams, a shogging out-throw cam for cooperating alternately with said advancing cams during reciprocating knitting, a carrier therefor, presser means for said needles movable with said out-throw cam, and means to vary the shogging movement of said out-throw cam and its carrier and the position of the presser means relatively to said advancing cams.

26. In a knitting machine having spring beard needles, yarn feeding means, stitch cams to function the needles during reciprocating knitting, web holders, web holder advancing cams to cooperate respectively with said stitch cams, a web holder out-throw cam between said web holder advancing cams to cooperate at times with each of them, said advancing cams and said out-throw cam being movable relative to each other, so that the out-throw cam may at times cooperate with each advancing cam, and a presser cam having a fixed relation with one of said web holder cams, and therefore a relative movement with respect to the remainder of said web holder cams.

27. In a circular, spring needle, knitting machine having web holders or like instrumentalities, a circular series of spring needles, a circular series of web holder or like instrumentalities, operating means for the latter including inner and outer concentric rings, and pressure means for said needles, carried by one of said rings.

28. In a circular, spring needle, knitting machine having web holders or like instrumentalities, a circular series of spring needles, a circular series of web holders or like instrumentalities, operating means for the latter including inner and outer concentric rings, and pressure means for said needles, carried by one of said rings, said rings having relatively lost circumferential motion.

29. In a circular spring needle knitting machine, a circular series of spring needles, radially movable instruments cooperating therewith, operating means for the latter including inner and outer, relatively movable rings and presser means for said needles carried by one of said rings.

30. In a circular, spring needle, knitting machine, a circular series of spring needles, a presser cam therefor, a ring carrying said presser cam, a second ring concentric with the first, said two rings having relatively lost circumferential motion and a support for a series of web holders or like instrumentalities, said two rings overlying said support and its said web holders or like instrumentalities.

In testimony whereof, I have signed my name to this specification.

GEORGE P. BOSWORTH.